Patented Nov. 19, 1940

2,222,363

UNITED STATES PATENT OFFICE 2,222,363

TETRAHYDROFURFURYL ALPHA ACETOXY PROPIONATE

Houston V. Claborn, Arlington, Va.; dedicated to the free use of the People of the United States of America No Drawing. Application May 7, 1940, Serial No. 333,749

1 Claim. (Cl. 260—345)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to me of any royalty thereon.

I hereby dedicate the invention herein described to the free use of the people of the United States of America to take effect on the granting of a patent to me.

The present invention relates to a new and useful composition of matter, namely, tetrahydrofurfuryl alpha-acetoxypropionate, having the formula:

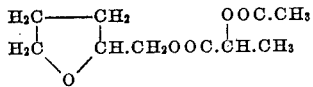

The object of my invention is the production of a compound that is useful as a solvent, and an intermediate in the production of tetrahydrofurfuryl acrylate, a substance polymerizable to plastic, semi-solid, or solid, materials useful in industry, because of their tensile strength, elasticity, plasticity, resistance to water, organic liquids and gases, and because of other desirable properties.

It is well known that methyl alpha-acetoxypropionate may be decomposed by pyrolysis to yield as one product methyl acrylate, which may be polymerized to substances useful in the plastic and related industries. However, ethyl alpha-acetoxypropionate and other alkyl alpha-acetoxypropionates of higher molecular weights have been found to be unsuitable for the production of the corresponding acrylates because of the preponderance of undesirable reactions giving products other than acrylates and because the polymers of these acrylates lack the properties desired in industry.

I have discovered that, as a result of the peculiar and unpredictable characteristics of the tetrahydrofurfuryl radical and its esters, its alpha-acetoxypropionate may be converted readily and with high yields into tetrahydrofurfuryl acrylate, which may be polymerized into substances useful in industry.

This invention is directed to tetrahydrofurfuryl alpha-acetoxy propionate, a new and useful compound, namely, readily convertible to the corresponding acrylate and polymers thereof, as well as a solvent for resins. Tetrahydrofurfuryl alpha-acetoxypropionate may be made from tetrahydrofurfuryl lactate by acetylation by means of any of the common acetylating agents.

I have successfully used acetic anhydride as acetylating agent, but prefer to use ketene, as described by Claborn and Smith (Journal of the American Chemical Society, vol. 61, pp. 2727, 2728 (1939)).

*Example 1.*—A mixture of 56 grams of acetic anhydride and 1.8 g. of sulphuric acid was added dropwise, with constant stirring to 87 g. (½ mole) of tetrahydrofurfuryl lactate. The reaction flask was immersed in ice water and the acetic anhydride added at such a rate that the temperature of the reaction did not rise above 25° C. When all of the acetic anhydride had been added, the mixture was left at room temperature for 1 hour. Calcium carbonate (1.8 g.) was added to the reaction mixture and stirred for ten minutes to neutralize the sulphuric acid used as a catalyst. The mixture was filtered and the filtrate fractionated at reduced pressure. The tetrahydrofurfuryl alpha-acetoxy propionate, which distilled at 126–30° at 6.2 mm., weighed 96 grams. The yield was 88 percent of the theoretical.

*Example 2.*—Five hundred grams (2.87 moles) of tetrahydrofurfuryl lactate containing one drop of sulphuric acid was treated with 129 grams (3.08 moles) of freshly prepared ketene gas, it being bubbled through the lactate at the rate of 0.28 mole per hour for 11 hours. The reaction produced heat and the reaction flask became quite warm during the reaction. After the current of ketene was stopped the reaction flask was allowed to stand overnight and the product distilled under vacuum. The yield was 593 grams of tetrahydrofurfuryl alpha-acetoxypropionate or 95 percent of the theory.

Prepared by any method, the tetrahydrofurfuryl alpha-acetoxypropionate is a colorless liquid that boils at 139° C. at 10 mm. pressure or at 129° C. at 6 mm. and has $$d_{25}^{25}=1.1245 \text{ and } N_D^{25}=1.4440$$

Having thus described my invention, what I claim for Letters Patent is:

A composition of matter, tetrahydrofurfuryl alpha-acetoxypropionate, having the formula:

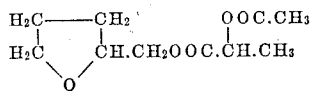

being a colorless liquid at 25° C., boiling at substantially 139° C. at 10 mm. pressure, having a specific gravity of substantially 1.1245 at 25° C., and having a refractive index for the yellow sodium line of substantially 1.4440 at 25° C.

HOUSTON V. CLABORN.